US006501446B1

(12) United States Patent
De Haan et al.

(10) Patent No.: US 6,501,446 B1
(45) Date of Patent: Dec. 31, 2002

(54) METHOD OF AND UNIT FOR PROCESSING IMAGES

(75) Inventors: Gerard De Haan, Eindhoven (NL); Michiel Adriaanszoon Klompenhouwer, Eindhoven (NL)

(73) Assignee: Koninklijke Philips Electronics N.V, Eindhoven (NL)

( * ) Notice: Subject to any disclaimer, the term of this patent is extended or adjusted under 35 U.S.C. 154(b) by 156 days.

(21) Appl. No.: 09/718,253

(22) Filed: Nov. 22, 2000

(30) Foreign Application Priority Data

Nov. 26, 1999 (EP) ............................................. 99203975

(51) Int. Cl.⁷ ............................. G09G 3/28; G09G 3/36; G09G 5/10
(52) U.S. Cl. .............................. 345/63; 345/60; 345/89; 345/690
(58) Field of Search .............................. 345/60, 63, 89, 345/147, 204, 589, 672, 690; 348/452, 458, 484; 375/240.16

(56) References Cited

U.S. PATENT DOCUMENTS

| 5,777,682 | A | * | 7/1998 | De Haan et al. ............. 348/452 |
| 5,841,413 | A | | 11/1998 | Zhu et al. ...................... 345/63 |
| 5,907,316 | A | * | 5/1999 | Mikoshiba et al. ......... 345/147 |
| 5,929,919 | A | * | 7/1999 | De Haan et al. ............. 348/452 |
| 6,034,734 | A | * | 3/2000 | De Haan et al. ............. 348/458 |
| 6,100,863 | A | * | 8/2000 | Zhu .............................. 345/89 |
| 6,278,736 | B1 | * | 8/2001 | De Haan et al. ........ 375/240.16 |
| 6,297,852 | B1 | * | 10/2001 | Laksono et al. ............. 348/584 |
| 6,310,588 | B1 | * | 10/2001 | Kawahara et al. ............. 345/63 |
| 6,331,843 | B1 | * | 12/2001 | Kasahara et al. ............. 345/63 |
| 6,335,735 | B1 | * | 1/2002 | Denda et al. ................ 345/589 |
| 6,348,930 | B1 | * | 2/2002 | Kobayashi et al. ......... 345/672 |
| 6,373,477 | B1 | * | 4/2002 | Van Dijk ..................... 345/204 |

FOREIGN PATENT DOCUMENTS

JP          8211848       8/1996       ............ G09G/3/28

* cited by examiner

Primary Examiner—Bipin Shalwala
Assistant Examiner—David L. Lewis
(74) Attorney, Agent, or Firm—Edward W. Goodman (57) ABSTRACT

A display device (806) is driven by a video processing unit (804) in a number of sub-fields, each for outputting a respective illumination level by the display device. In each sub-field, a pixel of the displayed image may emit an amount of light corresponding to the particular sub-field, depending on whether it is switched on or not. Based on motion estimation, the desired intensity level of a particular pixel at the time point corresponding with the current sub-field is calculated. Subsequently, it is determined how much light has been generated by the pixels along the motion vector of the particular pixel and accumulated in the eye of a human observer. Then a target intensity level is calculated on the basis of the desired level and the already accumulated level. Based on this target level it is decided whether the particular pixel is to be lit in the current sub-field.

10 Claims, 4 Drawing Sheets

METHOD OF AND UNIT FOR PROCESSING IMAGES

BACKGROUND OF THE INVENTION

1. Field of the Invention

The invention relates to a video processing unit for processing a series of images to be displayed on a display device, wherein a particular image is displayed in a plurality of periods called sub-fields, each of the sub-fields having a respective weight corresponding with a respective intensity level generated in this sub-field.

The invention further relates to a display apparatus comprising such a video processing unit.

The invention further relates to a method of processing a series of images to be displayed on a display device, wherein a particular image is displayed in a plurality of periods called sub-fields, each of the sub-fields having a respective weight corresponding with a respective intensity level generated in this sub-field.

2. Description of the Related Art

U.S. Pat. No. 5,841,413 describes a plasma display panel driven in a plurality of sub-fields. A plasma display panel is made up of a number of cells that can be switched on and switched off. A cell corresponds with a pixel (picture element) of the image that is to be displayed on the panel. In the operation of the plasma display panel, three phases can be distinguished. The first phase is the erasure phase in which the memories of all cells of the panel are erased. The second phase is the addressing phase, in which the cells of the panel that are to be switched on are conditioned by setting appropriate voltages on their electrodes. The third phase is the sustain phase, in which sustain pulses are applied to the cells which cause the addressed cells to emit light for the duration of the sustain phase. The plasma display panel emits light during this sustain phase. The three phases together are called a sub-field period or simply a sub-field. A single image, or frame, is displayed on the panel in a number of successive sub-field periods. A cell may be switched on for one or more of the sub-field periods. The light emitted by a cell in the sub-field periods in which it was switched on, is integrated in the eye of the viewer who perceives a corresponding intensity for that cell. In a particular sub-field period, the sustain phase is maintained for a particular time resulting in a particular illumination level of the activated cells. Typically, different sub-fields have a different duration of their sustain phase. A sub-field is given a coefficient of weight to express its contribution to the light emitted by the panel during the whole frame period. An example is a plasma display panel with 6 sub-fields having coefficients of weight of 1, 2, 4, 8, 16 and 32, respectively. By selecting the appropriate sub-fields in which a cell is switched on, 64 different intensity levels can be realized in displaying an image on this panel. The plasma display panel is then driven by using binary code words of 6 bits each, whereby a code word indicates the intensity level of a pixel in binary form.

As described above, the light emissions in the different sub-fields for a given pixel are integrated in the eye of the viewer resulting in a certain intensity level for that pixel. If a moving object is displayed, an artifact occurs in the image. In such a situation, the viewer tracks the moving object so that the eye moves between sub-fields. The integration of the light emissions is no longer perceived as one pixel of a certain intensity, but as light coming from different locations. Japanese Abstract JP 8211848 describes the application of motion estimation to compensate for motion between images. For a given sub-field, a pixel is moved from the original position to a corrected position on the basis of the motion vector and the delay for the particular sub-field. The pixel is typically moved to a sub-pixel position, i.e., the corrected position does not coincide with a location of another pixel. A problem is that the decision whether or not a cell is to be switched on in the particular sub-field is to be taken on pixel level. For a particular pixel, the cell is switched on or off and one cannot switch on the cell for a fraction to account for the fact that the corrected position does not fully coincide with this particular pixel.

SUMMARY OF THE INVENTION

It is an object of the invention to provide a video processing unit as described in the preamble with an improved reduction of motion artifacts. This object is achieved, according to the invention, in a video processing unit comprising:

first intensity calculating means for calculating for a particular pixel on the basis of motion estimation from the series of images a desired intensity level at a point in time corresponding with a current sub-field, means for obtaining, from the motion estimation, a current motion vector for the particular pixel, second intensity calculating means for calculating an accumulated intensity level integrated by a human observer along the current motion vector over a number of earlier processed sub-fields, if any, third intensity calculating means for calculating a target intensity level to be generated in the current and one or more subsequent sub-fields, if any, on the basis of the accumulated intensity level and the desired intensity level, and decision means for deciding whether the particular pixel is to be lit in the current sub-field on the basis of the target intensity level and the weight of the current sub-field.

By determining the level of intensity that is already realized for a particular pixel in earlier processed sub-fields, the video processing unit, according to the invention, can make a reliable and robust decision as to whether or not the particular pixel must be lit in the current sub-field. Any rounding errors in previous sub-fields can be taken into account by looking back and establishing in which sub-fields particular sub-fields have actually been lit. Among others, the invention is based on the insight that every sub-field provides a new chance to adapt the current word (given by a complete set of sub-fields at that time), such that the required intensity level is approached as close as possible.

An embodiment of the video processing unit according to the invention is by processing in the order of decreasing sub-field weights, the desired intensity level can easily be reached without running the risk of an overshoot in a certain sub-field which cannot be corrected in later processed sub-fields.

It is a further object of the invention to provide a method as described in the preamble with reduced motion artifacts. This object is achieved according to the invention in a method comprising the steps of:

calculating for a particular pixel on the basis of motion estimation from the series of images a desired intensity level at a point in time corresponding with a current sub-field, obtaining from the motion estimation a current motion vector for the particular pixel, calculating an accumulated intensity level integrated by a human observer along the current motion vector over a number of earlier processed sub-fields, if any, calculating a target intensity level to be generated in the current and one or more subsequent sub-fields, if any, on the basis of the accumulated intensity level and the desired intensity level, and deciding whether the particular pixel is to be ignited in the current sub-field on the basis of the target intensity level and the weight of the current sub-field.

BRIEF DESCRIPTION OF THE DRAWINGS

The invention and its attendant advantages will be further elucidated with the aid of exemplary embodiments and the accompanying schematic drawings, wherein:

FIG. 6 illustrates the procedure by showing the bi-linear interpolation of the 'virtual' sub-field value $$SF_i\left(\vec{x}+\begin{pmatrix}f_x\\f_y\end{pmatrix}\right)$$

from the four neighboring pixels;

DESCRIPTION OF THE PREFERRED EMBODIMENTS

Introduction

Display devices of the 'on-off' type use 'pulse-width-modulation' to realize gray scales. Plasma panels belong to this category. The luminance generated by a pixel is the integral of successive light emission periods with an often binary distribution of length. During a picture time a, 'word' of r light emission periods can be controlled to provide a gray scale with a resolution similar to an r-bits digital word. More details about this type of displays can be found at various places in the literature, e.g. in Ref. 2.

Figure 1:
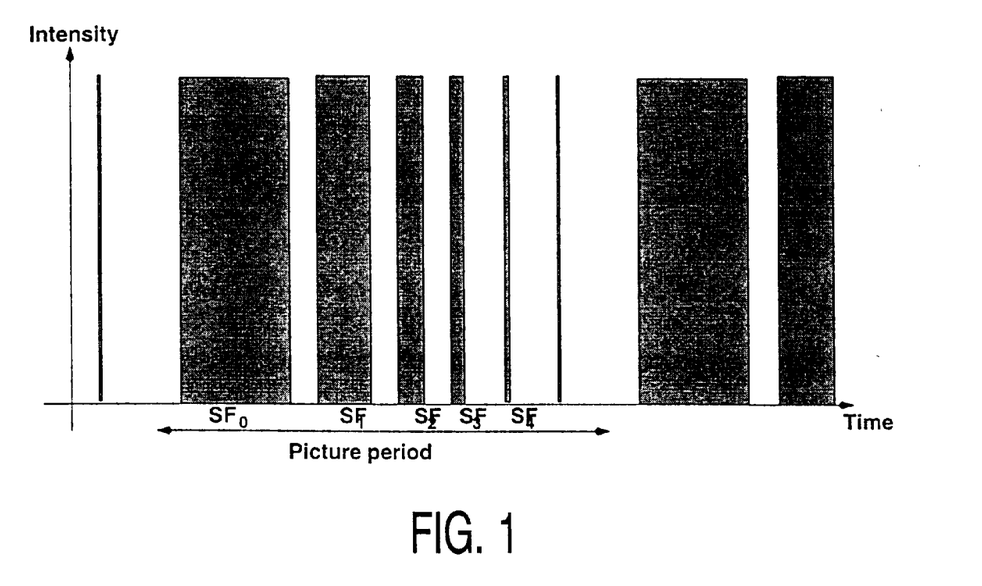
FIG. 1 shows that light-pulses (sub-fields) of different lengths can individually be lit to build a gray scale of intensities at the screen.

FIG. 1 shows that light-pulses (sub-fields) of different lengths can individually be lit to build a gray scale of intensities at the screen. In AC plasma panels, a sub-field consists of a varying number of light pulses, together realizing a certain intensity. It is assumed that the human visual system fully integrates the individual light pulses belonging to the same word, i.e., no flicker is seen. The weight of the light pulse is $2^i$ where i is the number of the so-called sub-field. This is not true for all screens produced nowadays. Particularly, the sub-fields with the highest weights are often divided in a number of sub-fields with accordingly smaller weights. This decreases motion artifacts at the cost of increasing the total number of sub-fields or decreasing the number of gray levels. The optimal drive for these types of displays can be derived using the description herein. Full integration over the picture period implies that the intensity $I(\vec{x})$ seen in a pixel at position $\vec{x}$ is:

$$I(x) = \sum_{i=0}^{r-1} 2^i SF_i(\vec{x}) \quad (1)$$

where the sub-field $SF_i(\vec{x})$ has a binary value for every pixel position, i.e., can be chosen 0, or 1 only, since a pixel must be either on or off during the sub-field period.

This procedure to generate gray levels yields good results, as long as the observer integrates the individual 'bits' of light belonging to the to the same word. This is not the case if the observer moves his attention from one position of the screen to another.

Such situations, however, are quite common in the event of motion in the scene. A human observer will usually track the moving objects with his/her eye, and thus integrate individual bits of different pixels. In other words, bits from individual pixels get mixed in new words that 'code' unintended brightnesses. This defect is rather annoying, and the recipe to optimally drive a plasma display panel in the event of motion is the challenge for which this paper presents the solution.

Calculation of the Optimal Luminance at the Time of Individual Sub-fields

Motion estimation and compensation has been implemented some years ago in scan conversion and coding ICs for consumer applications (see Refs. 4,1). This proved the feasibility of true-motion estimation and robust upconversion at a consumer price level. The motion estimator used is what is called a 3-D recursive search block-matcher in various earlier papers (see Refs. 3,7). This estimator achieves a quarter pixel accuracy, and a close to true-motion vector field, which is of vital importance for our application.

The Motion Estimator

Rather than calculating all possible candidate vectors, the recursive search block-matcher takes spatial and/or temporal 'prediction vectors' from a 3-D neighborhood, and a single updated prediction vector. This implicitly assumes spatial and/or temporal consistency. The updating process involves update vectors added to either of the spatial prediction vectors. Assuming blocks of height Y, width X, and center $\vec{x}$, we define a candidate set $CS(\vec{x}, t)$, from which, at time t, the block-matcher selects its result vector:

$$CS(\vec{X}, t) = \left\{\begin{array}{l} \left(\vec{D}\left(\vec{X}-\begin{pmatrix}X\\Y\end{pmatrix}, t\right)+\vec{U}_1(\vec{X}, t)\right), \\ \left(\vec{D}\left(\vec{X}-\begin{pmatrix}-X\\Y\end{pmatrix}, t\right)+\vec{U}_2(\vec{X}, t)\right), \\ \left(\vec{D}\left(\vec{X}-\begin{pmatrix}0\\2Y\end{pmatrix}, t-T\right)\right) \end{array}\right\} \quad (2)$$

where T is the picture period, $\vec{D}(\vec{x}, t)$ is the motion vector (displacement during picture period) found at position $\vec{x}$ at time t, and the update vectors $\vec{U}_1(\vec{x}, t)$ and $\vec{U}_2(\vec{x}, t)$ are block-alternatingly equal to the zero vector, or taken from a limited fixed integer update set, in our case:

$$US_i(\vec{X},t) = \begin{Bmatrix} \vec{0}, \\ \vec{u}_y & -\vec{u}_y & \vec{u}_x & -\vec{u}_x \\ 2\vec{u}_y & -2\vec{u}_y & 3\vec{u}_x & -3\vec{u}_x \end{Bmatrix} \quad (3)$$

where we introduce $$\vec{u}_x = \begin{pmatrix} 1 \\ 0 \end{pmatrix} \text{ and } \vec{u}_y = \begin{pmatrix} 0 \\ 1 \end{pmatrix}$$

To realize sub-pixel accuracy, the update set of Eq. 2 is extended with fractional update values. An overall quarter pixel resolution is achieved by adding the following fractional update vectors to the update set:

$$US_f(\vec{X},t) = \{\tfrac{1}{4}\vec{u}_y, -\tfrac{1}{4}\vec{u}_y, \tfrac{1}{4}\vec{u}_x, -\tfrac{1}{4}\vec{u}_x\} \quad (4)$$

The estimator chooses its output motion vector $\vec{D}(\vec{x},t)$ from the candidates, using the mean absolute difference (MAD) criterion. Because of the small number of candidate vectors that have to be evaluated, the method is very efficient, i.e., only a few MADs have to be calculated. Furthermore, due to the inherent smoothness constraint, it yields very coherent vector fields that closely correspond to the true-motion of objects.

The Motion Compensated Interpolation

Motion compensation can be very straightforward, i.e., just fetch the luminance from a position shifted over the estimated motion vector. Although simple, such a simple method shows rather strong artifacts in case of erroneous vectors. Such vector errors cannot always be prevented, as some temporal effects in an image sequence cannot adequately be described in terms of translations. Therefore, a robust motion compensation algorithm should preferably be applied. Robust here is meant in a sense that the algorithm includes protection mechanisms that prevent extreme degradations in the event of erroneous motion vectors. To that end, rather than just shifting, or slightly better, averaging the motion compensated luminance values from the neighboring pictures:

$$I(\vec{x},t-\alpha T)=\tfrac{1}{2}(\alpha I(\vec{x}+\alpha\vec{D},t)+(1-\alpha)I(\vec{x}-(1-\alpha)\vec{D},t-T)); \ 0\le\alpha\le T \quad (5)$$

which is the common procedure, our robust algorithm see Refs. 6,8,5 performs a non-linear filtering of motion compensated and non-motion compensated pixels:

$$I_{MC}(\vec{x},t-\alpha)=Med\{I(\vec{x}+\alpha\vec{D},t),I(\vec{x}-(1-\alpha)\vec{D},t-T),I_{av}(\vec{x},t)\} \quad (6)$$

where $I_{av}$ is defined as:

$$I_{av}(\vec{x},t)=\tfrac{1}{2}(I(\vec{x},t)+I(\vec{x},t-T)) \quad (7)$$

and Med is the median function, defined as:

$$Med(A,B,C) = \begin{cases} A, & (B<A<C) \vee (C<A<B) \\ A, & (A\le B \le C) \vee (C \le B \le A) \\ C, & \text{otherwise} \end{cases} \quad (8)$$

Motion Compensation and Plasma Displays

From the previous section, it appears to be possible, at any moment in time, to know what the intensity of the display should be. Clearly, the correct value for the intensity of a pixel changes over time in case of motion and it even changes within a picture period. Complication is that with the PDP we can, at a given point in time, i.e., the time of a sub-field, only choose between a certain fixed amount of light or no light at all. What we see then depends on that choice and the earlier choices for sub-fields at the position of pixels on the motion trajectory of the current pixel.

Figure 2:
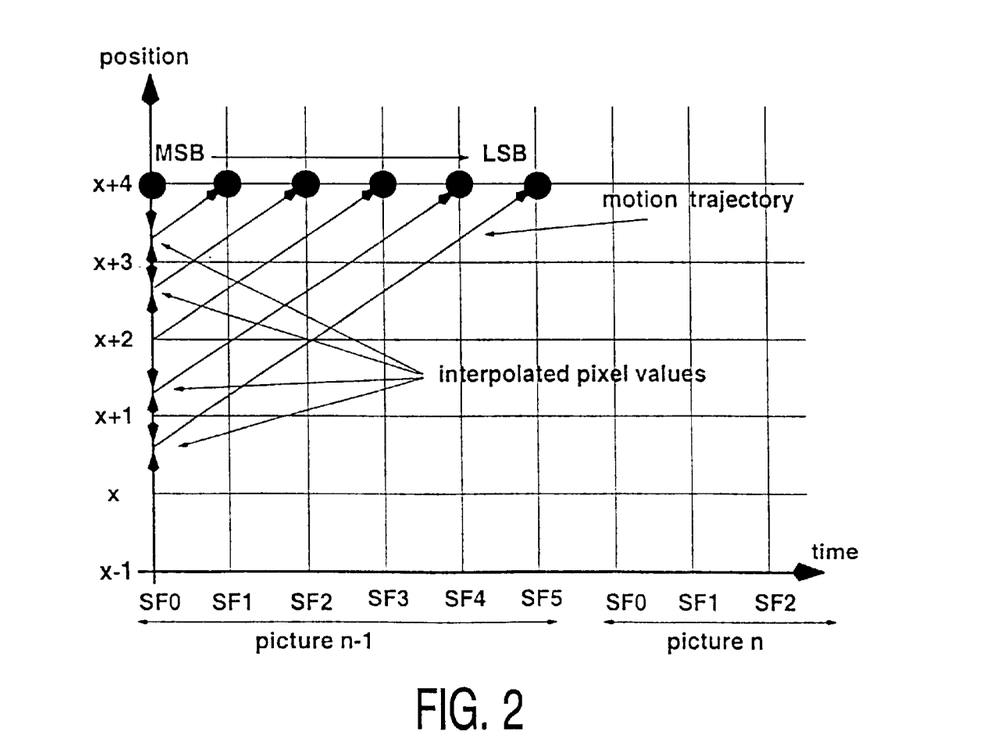
FIG. 2 shows that it is possible to calculate motion compensated luminance values valid at the temporal instance of individual sub-fields, and use from that word, the bit with the weight corresponding to the sub-field.

FIG. 2 shows that it is possible to calculate motion compensated luminance values valid at the temporal instance of individual sub-fields, and use from that word, the bit with the weight corresponding to the sub-field. Values can be interpolated between existing pixels in an available picture. A simple way to deal with this, is to calculate the luminance at the temporal instance of every sub-field (e.g. using Eq. 5 or 6), and use from that value, the bit that corresponds with the current sub-field in terms of weight (FIG. 2). In an ideal situation where luminance stays completely the same at the motion trajectory, this would yield correct results. However, in case the luminance changes marginally, e.g., from value $2^{r-1}$ to $2^{r-1}-1$ (128 to 127 in an 8-bits display), it could be that both the most significant sub-field and all the other sub-fields are active resulting in an observed intensity corresponding to the value 255 along the motion trajectory. These small changes in luminance can be caused by changes in luminance of the moving object between the two frames when using multiple frames in the temporal interpolation (Eq. 5 or 6). Moreover, even when only one input frame is used, the motion vector will generally point at sub-pixel positions. The resulting luminance is therefore obtained by interpolation and can change along the motion trajectory, since the vector will start at integer pixel positions. Therefore there will still be mixing of bits from different words, resulting in unintended luminances. Although less severe than seen in uncompensated mixing (the 'original' artifact), this is not fully satisfactory.

Figure 3:
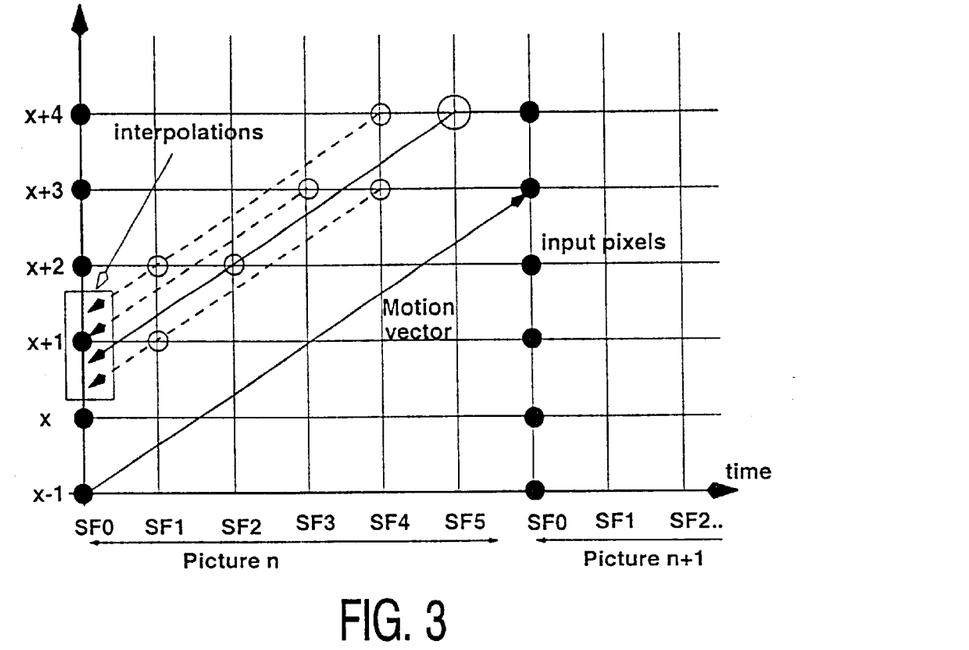
FIG. 3 shows that even with a single input frame, different luminances will be used along the motion vector, caused by starting the vector at integer pixels.

FIG. 3 shows that even with a single input frame, different luminances will be used along the motion vector, caused by starting the vector at integer pixels.

Figure 4:
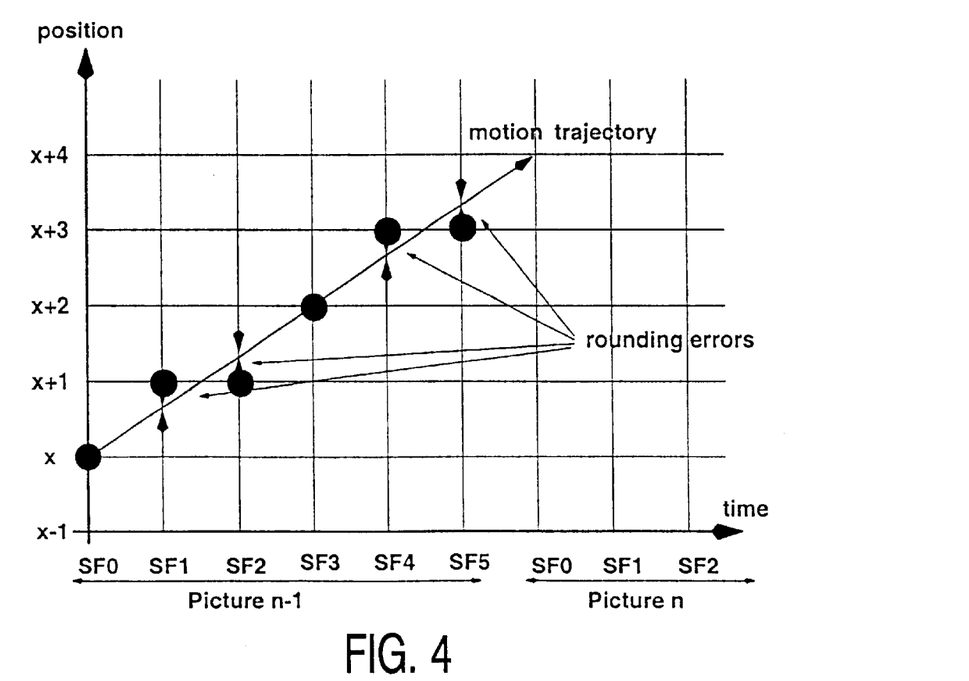
FIG. 4 shows that with a (1-dimensional) displacement of objects equal to 4 pixels between two pictures, and luminance value taken from the pixel at position $\vec{x}$ 4 out of the 6 bits are shifted to non-integer pixel positions and the ignition of a sub-field has to be rounded to the nearest pixel as illustrated.

FIG. 4 shows that with a (1-dimensional) displacement of objects equal to 4 pixels between two pictures, and luminance value taken from the pixel at position $\vec{x}$ 4 out of the 6 bits are shifted to non-integer pixel positions and the ignition of a sub-field has to be rounded to the nearest pixel as illustrated.

A more elegant solution results, if the luminance for a given pixel in the current picture is split in slices, corresponding to the weights of the sub-fields, that are individually shifted over a fraction of the motion vector describing the motion between successive pictures. The fraction corresponds to the temporal distance between the current picture and the gravitational center of the sub-field. Drawbacks of this concept are:

(Fractional) vectors may point to sub-pixel positions, i.e., it is unclear which pixels to light for that sub-field, while it is impossible to divide the weight over pixels, since sub-fields have a fixed weight that cannot be changed. See FIG. 4 for an illustration of this rounding problem.

Vectors originating from different pixels may point to the same location (multiple assignment), and there may be areas in a sub-field to which no vector points (holes).

The first problem leads to rounding errors, i.e., due to slight mispositioning, darker and brighter regions will occur in (almost) flat regions, while algorithms to control this rounding such that minimal artifacts result are yet unclear, or resort to ad hoc decisions to 'repair' the rounding errors. The second problem also requires 'repair' algorithms, which assign luminance values to holes, and give priorities in case of double assignments. This is solved by ad hoc decisions. In the next subsection the general form of an optimal algorithm to prevent motion artifacts in plasma displays is described. The following subsections give some embodiments of this method.

Optimal Algorithm

A fundamental observation that leads to the proposed recipe, is that every sub-field provides a new chance to adapt the current word (given by a complete set of sub-fields at that time), such that the required luminance is approached as close as possible. The decision for the current sub-field is obtained through the following recipe:

Motion compensated interpolation enables us to know at any point in time, e.g., at the time of the current sub-field, what the luminance should be, e.g., using equation 5 or 6 (calculated value).

The current motion vector enables us to look back in time and calculate which luminance has been accumulated by the tracking human observer over a number of preceding sub-fields along the motion trajectory (accumulated value).

We can calculate a target luminance value that, in combination with the accumulated luminance, leads to a luminance that equals the calculated value:

$$\text{calculated} = F(\text{accumulated}, \text{target}) \tag{9}$$

The function F can be a simple averaging, but also more complex methods can be defined to combine the accumulated and target values.

The target luminance value determines the lighting of the pixel in the current sub-field, using some decision criterion. The creation of unintended luminances along the motion trajectory is prevented by appropriate choices of both the calculation of the target value (Eq. 9) and the decision criterion.

The proposed algorithm will be discussed in the following subsections. First, the general form of the algorithm is discussed, explaining the use of the accumulated, calculated and target value and the decision criterion. Then the current embodiment of the algorithm is presented.

Accumulated Luminance

To calculate the accumulated value over a number of preceding sub-fields, the complete set of r sub-fields is characterized by a set of weights $W_i$ and corresponding times $t_i$ ($0 \leq t_i < T$, where T is the picture period), with i running from 0 to r−1. "Preceding" is in the sense that they have already been calculated, the actual moment of display may be later than the current sub-field. Now, accumulating the light-pulses, e.g., over the last complete picture time, the accumulated luminance at time t (e.g., the time corresponding to the current sub-field) in the event of motion is:

$$I_A(\vec{x}, t) = \sum_{j=0}^{r-1} W_j SF_j\left(\vec{x} - \left(\frac{t-t_j}{T} + m\right)\vec{D}(\vec{x}, t), n - m\right), \tag{10}$$

Where $SF_j(\vec{x}, n)$ is the state (0 or 1) of sub-field j at position x in frame n. The integer m indicates in which frame the particular sub-field is located (m=0 for the current frame, m=1 for the previous frame, etc). Therefore, when summing over the last picture time, $$m = \begin{cases} 0 & \text{if } t > t_j \\ 1 & \text{if } t \leq t_j \end{cases} \tag{11}$$

For the calculation of the accumulated luminance in equation 10, interpolation on the pixel grid will generally be necessary. This is because $SF_j(\vec{x}, n)$ exists for discrete values of $\vec{x}$ only, while $$\vec{x} - \left(\frac{t-t_j}{T} + m\right)\vec{D}(\vec{x}, t)$$

can have a non-integer value.

The choice of word boundary, i.e., which sub-fields (in time) are grouped into said complete set, is not fixed by the proposed method. It is even possible to use more (or less) than r sub-fields in the accumulation. The resulting value can no longer be referred to as a 'word', but with proper interpretation, it may still be of interest to the algorithm, as described in section 'current embodiment'.

Figure 5:
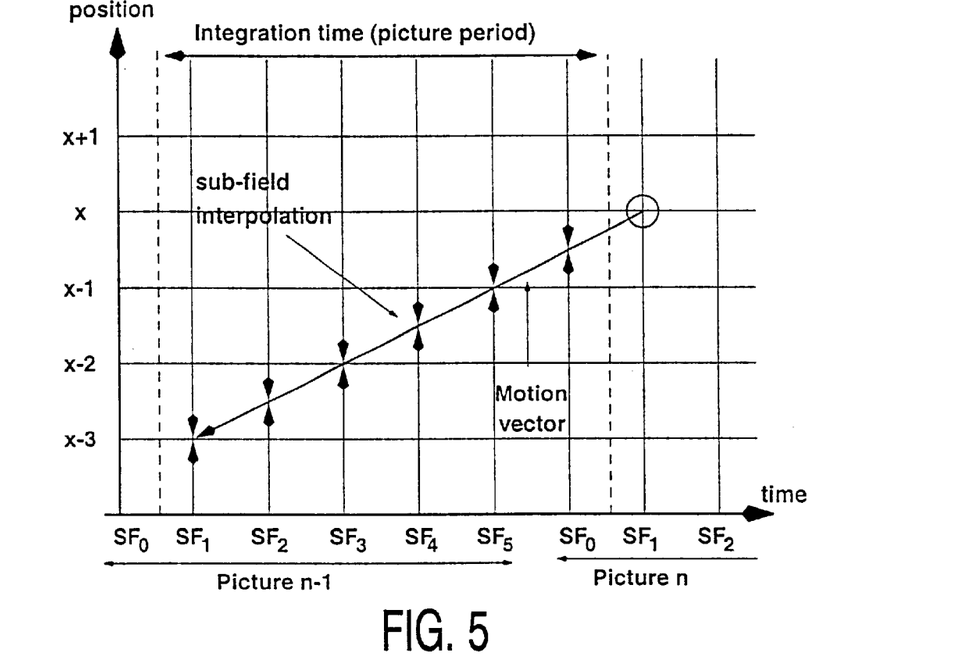
FIG. 5 illustrates the calculation of the luminance accumulated so far.

FIG. 5 illustrates the calculation of the luminance accumulated so far ($t=t_1$, $r=6$, eq 10). The sum of preceding sub-fields on the motion trajectory is calculated. If the motion vector does not pass through the center of a pixel, the contribution of the sub-field is interpolated spatially from neighboring pixels (one spatial dimension is left out for clarity). So the light emission that contributes to the luminance of our current pixel results from an interpolation using the pixels around the vector endpoint. These pixels not necessarily have the same decision for that sub-field. In case of different decisions, the net result is something like a sub-field with a different weight, which, in first order approximation, equals the value obtained with a bi-linear interpolation.

Figure 6:
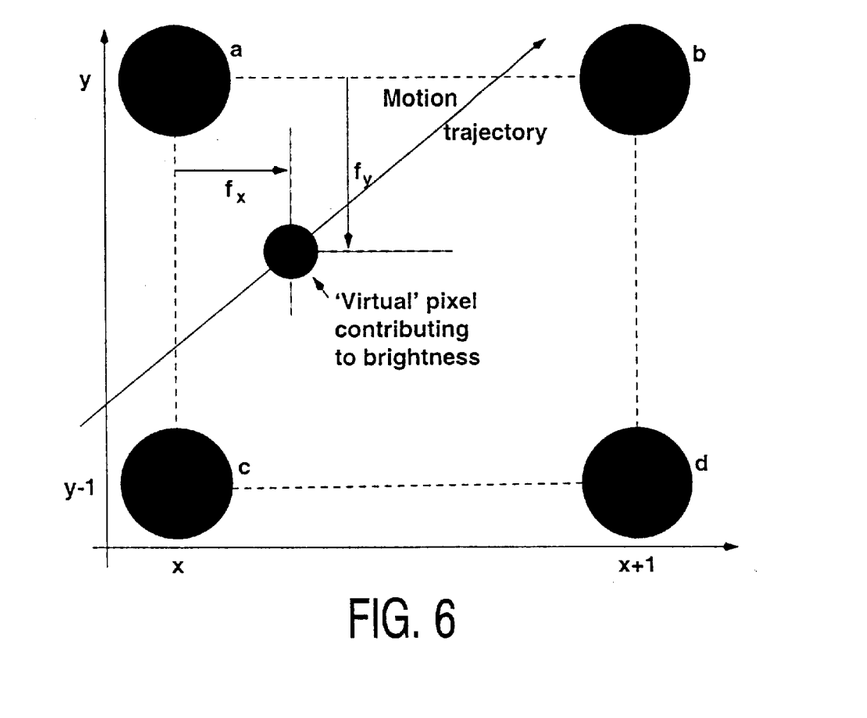

FIG. 6 illustrates the procedure by showing the bi-linear interpolation of the 'virtual' sub-field value $$SF_i\left(\vec{x} + \begin{pmatrix} f_x \\ f_y \end{pmatrix}\right)$$

from the four neighboring pixels. Using:

$$a = SF_i(\vec{x}), \quad b = SF_i\left(\vec{x} + \begin{pmatrix} 1 \\ 0 \end{pmatrix}\right), \tag{12}$$

$$c = SF_i\left(\vec{x} + \begin{pmatrix} 0 \\ 1 \end{pmatrix}\right), \quad d = SF_i\left(\vec{x} + \begin{pmatrix} 1 \\ 0 \end{pmatrix} + \begin{pmatrix} 0 \\ 1 \end{pmatrix}\right)$$

the value of $$SF_n\left(\vec{x} + \begin{pmatrix} f_x \\ f_y \end{pmatrix}\right)$$

is calculated as:

$$SF_i\left(\vec{x} + \begin{pmatrix} f_x \\ f_y \end{pmatrix}\right) = (1 - f_x)((1 - f_y)a + f_y c) + f_x((1 - f_y)b + f_y d) \tag{13}$$

with $f_x$ and $f_y$ being the positive sub-pixel fraction in horizontval the direction, respectively, resulting from motion. Note that in this case, the value of $SF_i$ can be between 0 and 1, i.e., not necessarily binary. Furthermore, the calculations operate on one bit slice only, i.e., no full multipliers (for a . . . d) are required.

Using the Accumulated Value to Decide upon Ignition

After approximating the luminance created at a certain pixel along the motion trajectory over the preceding sub-fields (accumulated value), the decision must be taken to light the pixel in the current sub-field or not. This decision is based on the weight of the current sub-field and an estimate of the luminance to be created in the next sub-fields, the target luminance. The target luminance is calculated using two values: the accumulated luminance and the calculated luminance. Using the first one should prevent the creation of unintended luminances along the motion trajectory. The second assures that the image contents are displayed at the right position at the right time, by motion compensating the input data (e.g. using Eq 6). Note that these two properties are largely independent: it is possible to use the motion compensated value without preventing unintended luminances and it is also possible to use the accumulated value without motion compensating the input data ('frame repetition' for every sub-field). This will only result in blurring the picture (much like a traditional liquid crystal display) without the contouring artifacts. So, there remain two tasks to be performed:

Combine the accumulated value and calculated value to determine the target value.

Decide upon lighting of the pixel, using the target value. These two tasks are not independent: the lighting criterion should take into account the definition of the target value, in particular how many sub-fields are involved. The concept of the target value is mainly useful for dividing the algorithm into separate parts, i.e., to separate the decision criterion and the temporal combination of sub-fields. Even though the current embodiment restricts both $I_A$ and $I_T$ to the same frame (see section 'Current embodiment'), future implementations may introduce some recursive algorithm which is conveniently described by introducing the target value. To calculate $I_T$ Eq. 9 has to be solved for $I_T$ (or it has to be defined in this way from the start, as in section 'Current embodiment'), for instance simple averaging ($0 \leq \alpha < 1$):

$$I_C(\vec{x}, t) = \alpha I_A(\vec{x}, t) + (1 - \alpha) I_T(\vec{x}, t) \Rightarrow \quad (14)$$

$$I_T(\vec{x}, t) = clip\left(\frac{I_C(\vec{x}, t) - \alpha I_A(\vec{x}, t)}{1 - \alpha}, 0, \max\right),$$

where clip(a,0,max) returns the value a, clipped between 0 and max. In this case, both $I_A$ and $I_T$ should refer to a whole word (r sub-fields), so their range corresponds with the range of $I_C$ (a word by definition). In this case, $I_T$ and $I_A$ use a 'running window' to choose the set of sub-fields to make up a word. Of course, any choice of window for $I_T$ and $I_A$ can be used (though not all will generate satisfying results), the proposed method only specifies the existence of an accumulated value, calculated value and target value. The decision for the pixel in the current sub-field now is based upon the target value at the time of the sub-field and the sub-field weight. As an example, just take the bit from that word corresponding to the weight of the sub-field to be switched:

$$SF_i(\vec{x}, n) = I_T(\vec{x}, t) \wedge W_i \quad (15)$$

This still leaves the possibility of mixing bits from different words. Furthermore, it has proven to be very difficult to incorporate recursiveness (a 'running window') in the algorithm, since this means that also $I_A$ is based on bits from different words, which makes the recursive loop very unstable (especially in case of motion that cannot be described by simple translation, such as covering/uncovering and moving shadows). But since the human visual system will always integrate the light emissions over frame boundaries, it is not unlikely that a recursive approach could be effective.

Improved Embodiment: 'Fill-up'

It turns out that using a 'running window' in the accumulation could introduce instabilities. This is prevented by restricting $I_T$ and $I_A$ together to a frame ($I_T$ uses k and $I_A$ uses 1 sub-fields, with k+1=r) and by using a 'fill-up' decision criterion.

The accumulation (Eq 10) now becomes:

$$I_A(\vec{x}, t_i) = \sum_{j=0}^{i-1} W_j SF_j\left(\vec{x} - \left(\frac{t_i - t_j}{T} + m\right)\vec{D}(\vec{x}, t_i), n - m\right), \quad (16)$$

where i is the number of the current sub-field and m is always zero. The target value represents the luminance needed in the remaining sub-fields to make $I_C$ equal to $I_A$ at the end of the frame:

$$I_T(\vec{x}, t) = I_C(\vec{x}, t) - I_A(\vec{x}, t) \quad (17)$$

In doing so, the sub-fields have to be processed in order of weight (from high to low), to 'fill-up' the desired luminance correctly. The order of processing is not necessarily the same as the order of actual display. Finally, the decision criterion completes the 'fill-up' procedure:

$$SF_i(\vec{x}, n) = I_T(\vec{x}, t) \geq W_i \quad (18)$$

Figure 7:
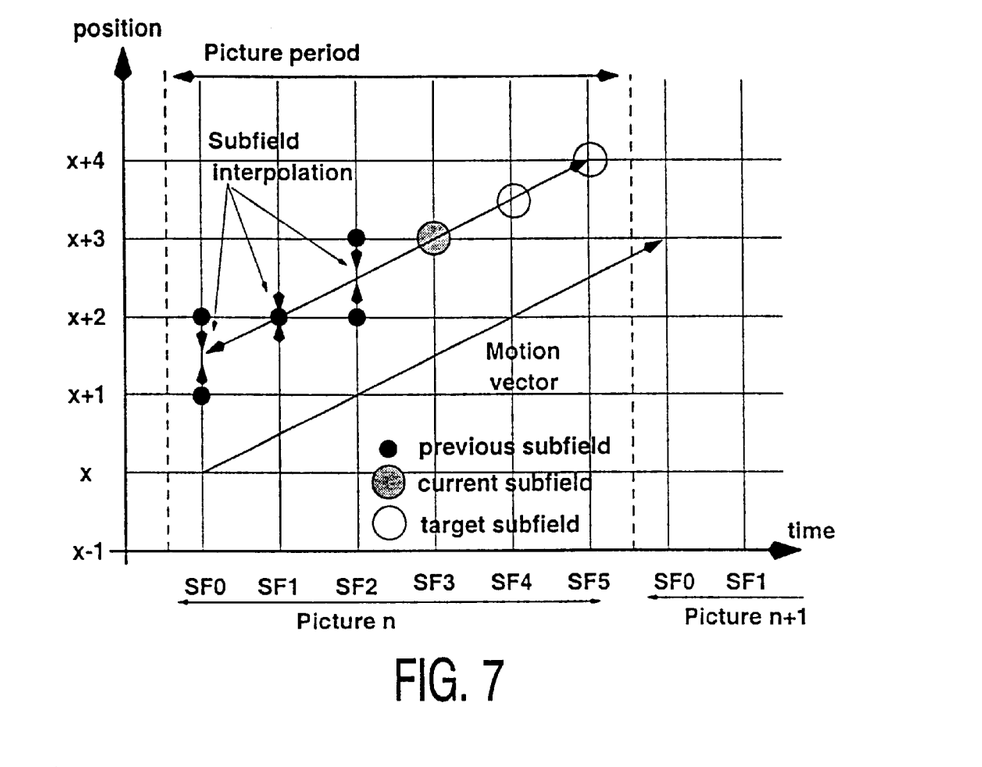
FIG. 7 illustrates the fill-up method using sub-fields from the same input frame during 'fill-up' compensation.

In words: only ignite this sub-field for this pixel if the resulting luminance does not exceed the desired value. This is based on the observation that, by starting with zero luminance at the start of a frame, there is no way to compensate any overshoot in created luminance by switching subsequent sub-fields (which would be possible in a recursive algorithm). FIG. 7 illustrates the fill-up method using sub-fields from the same input frame during 'fill-up' compensation.

A further improvement includes a means to minimize the visibility of remaining artifacts by combining the choice for a group of pixels, minimizing a 'cost function'. Even though the algorithm according to the invention is optimal, perfect compensation is not always possible due to the discrete pixel structure The following subsection describes the calculation of the 'cost function' for a group of pixels.

Combined Decision for a Group of Pixels

As mentioned at the beginning of this section, rounding errors are inevitable. When regarding a group of pixels, however, it is possible to minimize the total effect of the rounding errors in that group. To this end, we define a cost function $\epsilon(\vec{x}, t)$ according to:

$$\varepsilon(\vec{x}, t) = \sum_{i=-I}^{I} \sum_{j=-J}^{J} \left| I_C\left(\vec{x} + \binom{i}{j}, t\right) - I_A\left(\vec{x} + \binom{i}{j}, t\right) \right|^p \quad (19)$$

where $I_C(\vec{x}, t)$ is the motion compensated luminance value (the calculated 'should be' intensity) and $I_A(\vec{x}, t)$ the realized (accumulated) intensity for a given choice of the ignition of the sub-field for the pixel at position $\vec{x}$. The power p is typically 1 if we aim at minimizing the DC-error in the block. It may be, however, that minimizing a mean square error (p=2) is perceptually better. Here, experiments are used to determine the exact cost function. Additional to the power, also the size of the block, which is determined by the choice of I and J, can be subject to experimental optimization. Evidently, the minimal error results from a recipe describing $SF_n$ for all pixels in the block. This implies that the optimization occurs at block frequency and not at pixel rate (no overlapping blocks).

Figure 8:
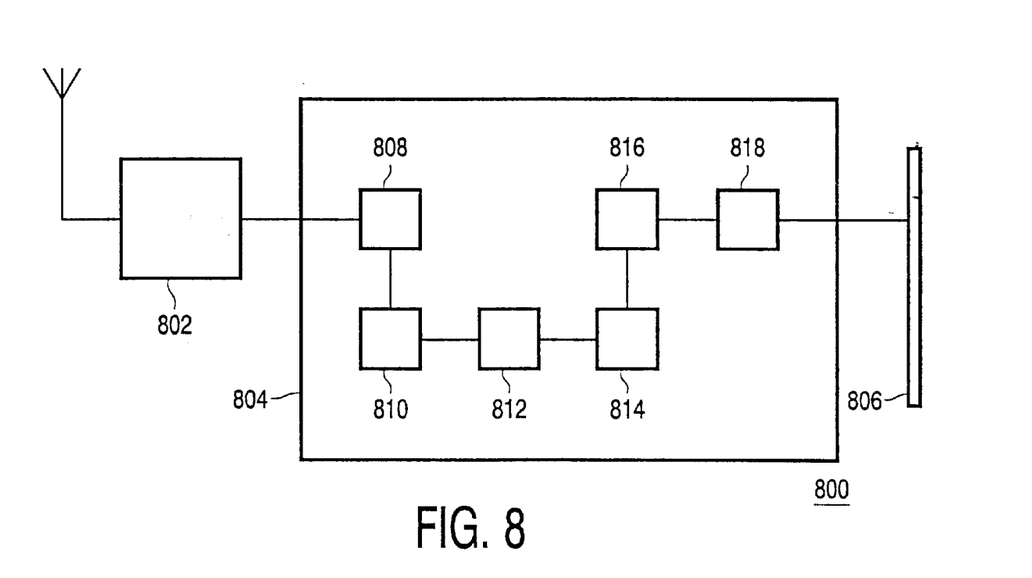
FIG. 8 shows the most important elements of a display apparatus according to the invention.

FIG. 8 shows the most important elements of an image display apparatus according to the invention. The image display apparatus 800 has a receiving means 802 for receiving a signal representing the images to be displayed. This signal may be a broadcast signal received via an antenna or cable but may also be a signal from a storage device like a VCR (Video Cassette Recorder). The image display apparatus 800 further has a video processing unit 804 for processing the image and a display device 806 for displaying the processed image. The display device 806 is of a type that is driven in sub-fields. The video processing unit has a motion estimator 808 that estimates the motion of individual pixels of an image. A first intensity calculation unit 810 uses the estimated motion to calculate an image at a time point between two original images. The chosen time point is related to a particular sub-field and may be chosen as the center of the time period of this sub-field. The first intensity calculation unit 810 calculates for each of the pixels what its intensity level should be. A second intensity calculation unit 812 calculates how much light will be accumulated by a human observer generated in the sub-fields that are already processed. To this end, the second intensity calculation obtains from the motion estimator the motion vector for a particular pixel and determines during which of the sub-fields the pixels along the motion vector have been lit. Then a third intensity calculation unit 814 calculates a target intensity level that is to be generated in the current and other remaining sub-fields. This calculation is done on the basis of the desired intensity level and the already accumulated intensity level. Subsequently, a decision unit 816 decides whether the pixel at hand must be lit in the current sub-field or not. This decision is made on the basis of the target intensity level and the weight of the current sub-field, since the weight indicates the intensity level that can be realized in the current sub-field. When all sub-fields have been processed and gathered together, a sending unit 818 sends the information to the display device 806 for the actual display of the image.

It should be noted that the above-mentioned embodiments illustrate rather than limit the invention and that those skilled in the art will be able to design many alternative embodiments without departing from the scope of the appended claims. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware.

REFERENCES (1) W. Bruls, A. van der Werf, R. Kleihorst, T. Friedrich, E. Salomons and F. Jorritsma, 'A single-chip MPEG-2 encoder for consumer storage applications', *Digest of the ICCE*, 1997, Chicago, pp. 262–263.

(2) R. van Dijk, 'Motion Compensation in PDPs part 1: Uniform velocities', *Nat.Lab. Technical Note* 391/97, December 1997.

(3) G. de Haan and H. Huijgen, 'Motion estimation for TV picture enhancement,' in *Signal Processing of HDTV III* (H. Yasuda and L. Chiariglione, eds.), Elseviers Science Publishers B.V., 1992, pp. 241–248.

(4) G. de Haan, J. Kettenis, and B. Deloore, 'IC for motion compensated 100 Hz TV, with a smooth motion moviemode,' *IEEE Transactions on Consumer Electronics*, vol. 42, May 1996, pp. 165–174.

(5) G. de Haan, P. W. A. C. Biezen and O. A. Ojo, 'An Evolutionary Architecture for Motion-Compensated 100 Hz Television,' in *IEEE Transactions on Circuits and Systems for Video Technology*, Vol. 5, No. 3, June 1995, pages 207–217.

(6) 'Motion-compensated picture signal interpolation', U.S. Pat. No. 5,495,300, Inventors: G. de Haan, P. Biezen, A. Ojo, and H. Huijgen.

(7) G. de Haan, P. Biezen, H. Huijgen, and O. Ojo, 'True motion estimation with 3-D recursive search blockmatching,' *IEEE Transactions on Circuits and Systems for Video Technology*, vol. 3, No. 5, October 1993, pp. 368–388.

(8) G. de Haan, P. W. A. C. Biezen, H. Huijgen and O. A. Ojo, 'Graceful Degradation in Motion-Compensated Field-Rate Conversion' in *Proceedings of the International Workshop on HDTV*, Ottawa, Canada, 1993, pages 249–256.

What is claimed is:

1. A video processing unit for processing a series of images to be displayed on a display device, wherein a particular image is displayed in a plurality of periods called sub-fields, each of the sub-fields having a respective weight corresponding with a respective intensity level generated in this sub-field, the video processing unit comprising:

first intensity calculating means for calculating, for a particular pixel on the basis of motion estimation from the series of images, a desired intensity level at a point in time corresponding with a current sub-field;

means for obtaining, from the motion estimation, a current motion vector for the particular pixel;

second intensity calculating means for calculating an accumulated intensity level integrated by a human observer along the motion vector over a number of earlier processed sub-fields, if any;

third intensity calculating means for calculating a target intensity level to be generated in the current and one or more subsequent sub-fields, if any, on the basis of the accumulated intensity level and the desired intensity level; and decision means for deciding whether the particular pixel is to be lit in the current sub-field on the basis of the target intensity level and the weight of the current sub-field.

2. The video processing unit as claimed in claim 1, wherein said video processing unit processes the sub-fields per image and in the order of decreasing weight of the sub-fields.

3. The video processing unit as claimed in claim 1, in which the third intensity calculating means calculates the target intensity level as being substantially equal to the desired intensity level minus the accumulated intensity level, and in which the decision means decides that the particular pixel is to be lit in the current sub-field if the target intensity level is larger than or equal to the weight of the current sub-field.

4. The video processing unit as claimed in claim 1, in which the decision means decides that the particular pixel is to be lit in the current sub-field on the basis of a minimization of the summed absolute difference between the desired intensity level and the accumulated intensity level for a group of pixels.

5. The video processing unit as claimed in claim 1, in which the decision means decides that the particular pixel is to be lit in the current sub-field on the basis of a minimization of the summed squared absolute difference between the desired intensity level and the accumulated intensity level for a group of pixels.

6. A display apparatus for displaying a series of images, comprising:

receiving means for receiving a signal representing the series of images;

a video processing unit as claimed in claim 1; and a display device for displaying the series of images.

7. A method of processing a series of images to be displayed on a display device, wherein a particular image is displayed in a plurality of periods called sub-fields, each of the sub-fields having a respective weight corresponding with a respective intensity level generated in this sub-field, the method comprising the steps:

calculating, for a particular pixel on the basis of motion estimation from the series of images, a desired intensity level at a point in time corresponding with a current sub-field;

obtaining, from the motion estimation, a current motion vector for the particular pixel;

calculating an accumulated intensity level integrated by a human observer along the motion vector over a number of earlier processed sub-fields, if any;

calculating a target intensity level to be generated in the current and one or more subsequent sub-fields, if any, on the basis of the accumulated intensity level and the desired intensity level; and deciding whether the particular pixel is to be lit in the current sub-field on the basis of the target intensity level and the weight of the current sub-field.

8. The method as claimed in claim 7, wherein the sub-fields are processed per image and in the order of decreasing weight of the sub-fields.

9. The method as claimed in claim 7, wherein the target intensity level is calculated as being substantially equal to the desired intensity level minus the accumulated intensity level, and wherein the particular pixel in the current sub-field is lit if the target intensity level is larger than or equal to the weight of the current sub-field.

10. The method as claimed in claim 7, wherein the articular pixel in the current sub-field is lit on the basis of a minimization of the summed absolute difference between the desired intensity level and the accumulated intensity level for a group of pixels.

* * * * *